United States Patent
Kobayashi

[11] Patent Number: 6,144,800
[45] Date of Patent: Nov. 7, 2000

[54] NOISE REDUCTION IN CORRELATED DIGITAL SIGNALS

[75] Inventor: Hiroshi Kobayashi, Kanagawa, Japan

[73] Assignee: Sony Corporation, Tokyo, Japan

[21] Appl. No.: 08/874,512

[22] Filed: Jun. 13, 1997

[30]   Foreign Application Priority Data

Jun. 17, 1996   [JP]   Japan ................................... 8-177043

[51] Int. Cl.[7] .................................................. H04N 5/911
[52] U.S. Cl. ........................... 386/114; 386/93; 348/241; 348/607
[58] Field of Search .................................. 386/9, 10, 21, 386/22, 114, 115, 116, 93; 348/607, 610, 611, 612, 618, 619, 620, 621, 622, 623, 624, 241

[56]   References Cited

U.S. PATENT DOCUMENTS

| | | | |
|---|---|---|---|
| 4,926,361 | 5/1990 | Ohtsubo et al. | 348/607 |
| 5,428,391 | 6/1995 | Murata et al. | 348/241 |
| 5,719,793 | 2/1998 | Nitta et al. | 348/607 |

*Primary Examiner*—Wendy Garber
*Assistant Examiner*—Christopher Onuaku
*Attorney, Agent, or Firm*—Frommer Lawrence & Haug, LLP.; William S. Frommer

[57]   ABSTRACT

A noise component is extracted from an input correlated digital signal, such as a digital video signal in which image information is substantially the same from one frame to the next. The extracted noise is multiplied by a feedback coefficient that varies non-linearly with respect to the value of the extracted noise, this feedback coefficient being switched on a random or pseudo-random basis.

22 Claims, 7 Drawing Sheets

Fig. 2A

| INPUT | OUTPUT |
|---|---|
| ⋮ | ⋮ |
| 6.0 | 0.0 |
| 5.0 | 0.0 |
| 4.0 | 3.0 |
| 3.0 | 3.0 |
| 2.0 | 2.0 |
| 1.0 | 1.0 |
| 0.0 | 0.0 |
| -1.0 | -1.0 |
| -2.0 | -2.0 |
| -3.0 | -3.0 |
| -4.0 | -3.0 |
| -5.0 | 0.0 |
| -6.0 | 0.0 |
| ⋮ | ⋮ |

| INPUT | OUTPUT |
|-------|--------|
| ⋮ | ⋮ |
| 6.0 | 0.0 |
| 5.0 | 0.0 |
| 4.0 | 3.0 |
| 3.0 | 2.0 |
| 2.0 | 1.0 |
| 1.0 | 0.0 |
| 0.0 | 0.0 |
| -1.0 | 0.0 |
| -2.0 | -1.0 |
| -3.0 | -2.0 |
| -4.0 | -3.0 |
| -5.0 | 0.0 |
| -6.0 | 0.0 |
| ⋮ | ⋮ |

NOISE REDUCTION IN CORRELATED DIGITAL SIGNALS

BACKGROUND OF THE INVENTION

This invention relates to a technique for reducing noise that may be present in a digital signal and, particularly, in a correlated digital signal, such as a digital video signal, without deteriorating the quality of the noise-reduced digital signal and without requiring large memory and large processing capacity to achieve such noise reduction.

Noise reduction in digital image signal processing is known to use a recursive noise filter incorporating a frame memory. Small differences in the image information from one frame to the next are extracted from an input digital image signal and are interpreted as a noise component. This noise component is subtracted from the input digital image signal; and the resultant noise-reduced digital image signal is written into the frame memory of the recursive filter. Such recursive noise filters also are known to use field memories rather than frame memories in order to reduce the cost of the memory device.

Figure 1:
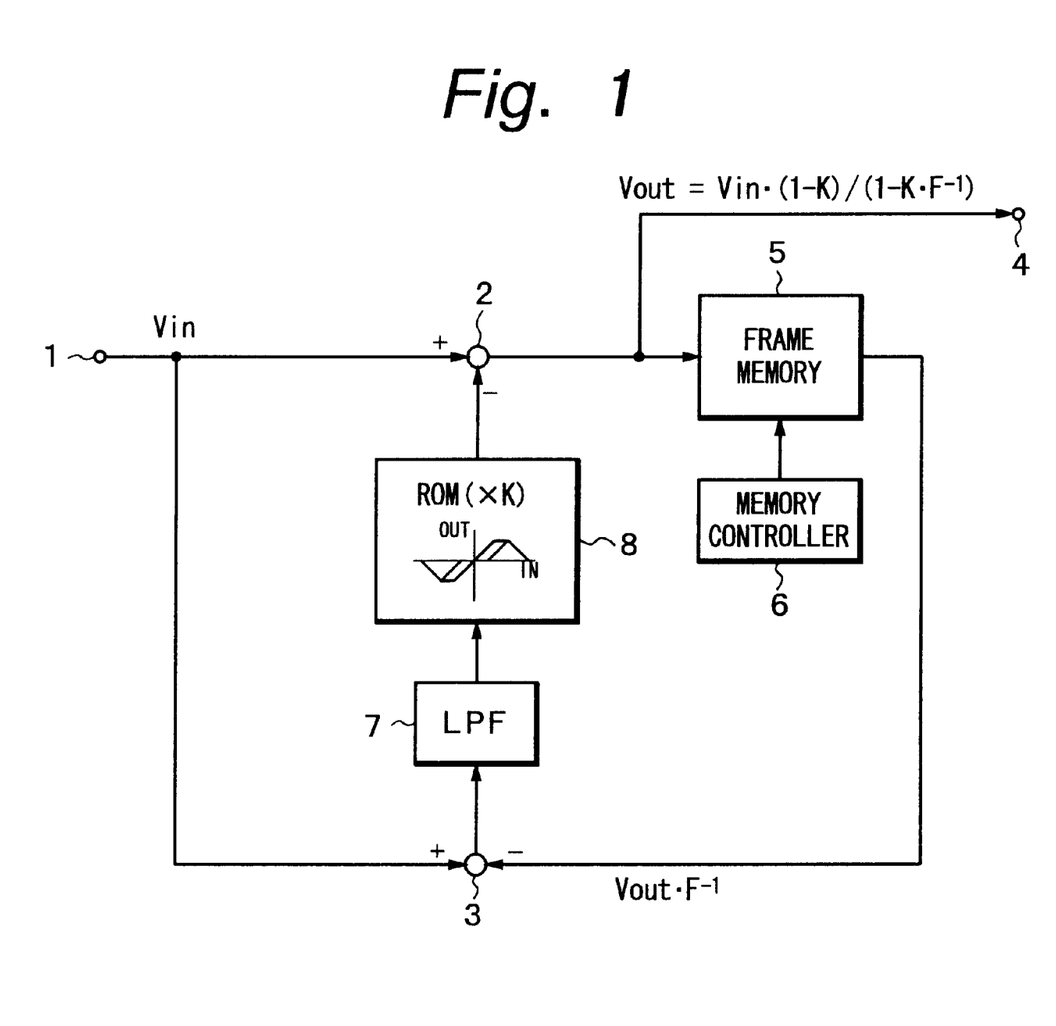
FIG. 1 is a block diagram of a noise reducing technique that suffers from disadvantages which are avoided by the present invention.

FIG. 1 is an example of a proposed recursive noise filter incorporating a frame memory 5 and a subtractor 2 from which a noise component derived from a subtractor 3 is, in turn, subtracted from an input digital image signal $V_{in}$ supplied to subtractor 2 from an input terminal 1. The noise-reduced image signal $V_{out}$ produced at the output of subtractor 2 is stored in frame memory 5; and this noise-reduced image signal $V_{out}$ also is coupled to an output terminal 4 for further processing, display, transmission, recording, or the like. The frame memory thus stores a given frame of the noise-reduced signal which is compared to the next-following frame of the image signal; and differences therebetween are interpreted as an extracted noise component. The read/write operations of frame memory 5 are controlled by memory controller 6.

Figure 2A:
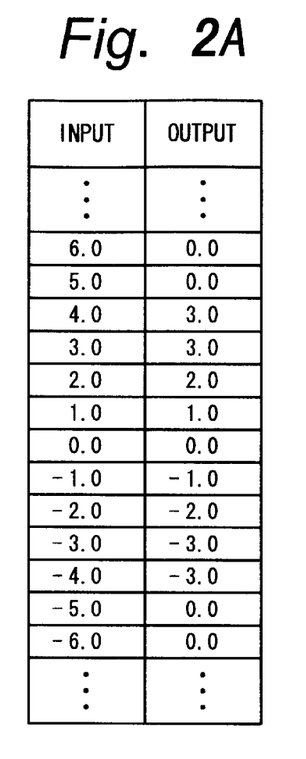
FIGS. 2A and 2B are schematic representations of the look-up table that may be used to constitute ROM 8 in FIG. 1.

If the noise-reduced image signal is represented as $V_{out}$, the one-frame delayed version of that noise-reduced image signal is referred to as $V_{out} \cdot F^{-1}$, where $F^{-1}$ refers to the one-frame delay imparted to the noise-reduced image signal by frame memory 5. Subtractor 3 subtracts from the presently received frame of input image signal $V_{in}$ the one-frame delayed version of the preceding frame of the noise-reduced image signal, representing the output of the subtractor as $V_{in} - V_{out} \cdot F^{-1}$. Assuming no, or very little, motion from one frame to the next, the value of the difference signal produced by subtractor 3 represents the noise component that is present in the input digital image signal $V_{in}$. This difference signal is subjected to low pass filter processing by a low pass filter 7 in order to band-limit the extracted noise component; and the band-limited noise component is processed by a non-linear circuit 8. The non-linear circuit multiplies the extracted noise component by a feedback coefficient K whose value changes as a function of the value of the extracted noise component produced by subtractor 3. Non-linear circuit 8 is constructed as a read only memory (ROM) which produces an output value as a function of the input value supplied thereto from subtractor 3 and low pass filter 7. This 5 input value may be thought of as an address signal; and the value stored in the location of ROM 8 corresponding to the address represented by the extracted noise component is read therefrom. FIG. 2A represents a suitable ROM, or look-up table, wherein the column labeled "input" may be thought of as the address supplied to the ROM from subtractor 3 and the column labeled "output" may be thought of as the value read from the ROM. It is appreciated therefore, that the value read from ROM 8 is K times the value of the extracted noise component. A graphical representation between the extracted noise component, or input value supplied from subtractor 3 to ROM 8, and the output value read from the ROM is illustrated in FIG. 2B.

If it is assumed that ROM 8 stores eight-bit values and is addressed by an eight-bit noise component extracted by subtractor 3, then for those values of the extracted noise component in the arbitrary range of −3.0 to +3.0, the feedback coefficient K exhibits the value 1 (i.e., K=1). When the value of the extracted noise component is between 3.0 and 4.0 (or between −3.0 and −4.0), the output value read from ROM 8 remains fixed at +3.0 (or −3.0, as the case may be); and when the value of the extracted noise component is greater than 5.0 (or −5.0), the value read from ROM 8 is 0. It is recognized, therefore, that the relationship between the input value supplied as an address to ROM 8 and the output value read from the ROM is nonlinear.

The purpose of this non-linearity between the extracted noise component supplied to ROM 8 and the value of the multiplied noise component read from the ROM is to assure that a noise component and not a motion component is subtracted from the input image signal $V_{in}$. It is assumed that an extracted noise component outside the range −5.0 to +5.0 (as depicted in FIG. 2B) is not a noise component but, rather, is a motion component. By multiplying the component extracted by subtractor 3 by the non-linear feedback coefficient K, only a noise component and not a motion component is supplied to subtractor 2 and removed from the input signal $V_{in}$. It will be understood that this range −5.0 to +5.0, as depicted in FIG. 2B, is relatively small.

Figure 2B:
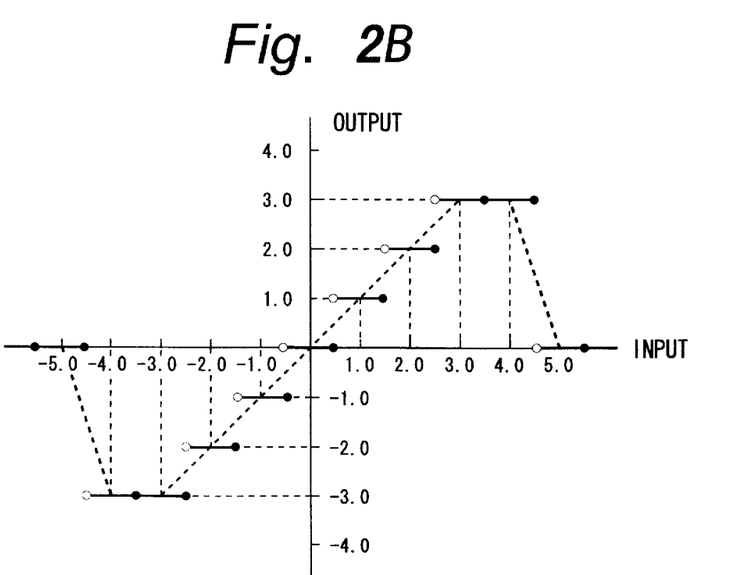

If the word length of the extract noise component is unlimited, that is, if a very large number of bits are used to represent the extracted noise component, the input/output relationship of ROM 8 will be as represented by the broken lines shown in FIG. 2B. However, there is a limitation on the number of bits which should be used to represent the extracted noise component; and as a result, the input/output characteristic is step-wise, as represented by the solid horizontal lines shown in FIG. 2B. Thus, when the value of the extracted noise component supplied to ROM 8 is in the range 0.5 to 1.5, the value read from the ROM is 1.0. For convenience, the open circle in FIG. 2B indicates that the range read from ROM 8 is, in actuality, greater than the indicated lower limit. That is, the output value read from ROM 8 is 1.0 when the extracted noise component supplied to the ROM is greater than 0.5 and equal to or less than 1.5.

From the foregoing, it is appreciated that the extracted noise component processed by ROM 8 and supplied to subtractor 2 may be represented as $K \times V_{out} \cdot F^{-1}$. This processed, extracted noise component may be thought of as the noise value; and this noise value is subtracted from the input image signal $V_{in}$ by subtractor 2. The result of this subtraction may be mathematically expressed as:

$$V_{out} = V_{in} - K \cdot (V_{in} - V_{out} \cdot F^{-1}) = V_{in} \cdot (1-K)/(1 - K \cdot F^{-1}) \qquad (1)$$

To improve the noise reducing effect achieved by the apparatus depicted in FIG. 1, the feedback coefficient K may be thought of as a multi-bit signal; but this has the effect of requiring very large word-lengths for the noise component extracted by subtractor 3 and for the output values stored in ROM 8. Consequently, the memory capacity of ROM 8 would have to be quite large, resulting in higher costs. To avoid this, it has been suggested that the value of the feedback coefficient K should be set to 1; and if K=1 is used in equation (1), the following is produced:

$$V_{out}=V_{out} \cdot F^{-1} \qquad (2)$$

In the limited range between −3.0 and +3.0 in the extracted noise component as depicted in FIG. 2B, the feedback coefficient K exhibits the value 1.0; and from equation (1) it will be recognized that $V_{out}=V_{out} \cdot F^{-1}$. This means that the contents of the image signal stored in memory 5 remain constant and do not change. Stated otherwise, when the frame difference of the video signal is zero, or very small, the least significant bits of each image sample do not change and remain frozen. This "freezing" of the least significant bits results in deterioration of the output image signal and a consequential deterioration in the image picture displayed therefrom.

The present invention proceeds on the recognition that if the value of the feedback coefficient K is less than 1.0, the least significant bits of the image signal stored in the frame memory will not be frozen. However, simply by relying upon a feedback coefficient K<1 results in a problem attributed to the fact that the word length of the extracted noise component must be limited. In particular, the possible values of the feedback coefficient K, if set to sporadic values and not set with any precision, may be expected to impair the noise reduction effect achieved by the arrangement shown in FIG. 1.

OBJECTS OF THE INVENTION

Accordingly, it is an object of the present invention to provide an improved noise reducing technique which does not impair the expected noise reduction even when the word length of the digitized signals is limited.

Another object of this invention is to provide an improved noise reducing technique that can be used with digital signals exhibiting good correlation, such as digital image (or video) signals.

A further object of this invention is to prevent a deterioration in the quality of the picture produced by a noise-reduced digital image signal.

An additional object of this invention is to provide a noise reducing technique that extracts a noise component from an input correlated digital signal, adjusts the gain of the extracted noise component as a function of the value of the extracted component and changes the gain on a random or pseudo-random basis so as to avoid deterioration in the noise-reduced digital signal.

Various other objects, advantages and features of the present invention will become readily apparent from the ensuing detailed description, and the novel features will be particularly pointed out in the appended claims.

SUMMARY OF THE INVENTION

In accordance with this invention, a noise reduction technique is provided for use with a correlated digital signal, such as a digital video signal, wherein a noise component is extracted from the input digital signal and is subtracted from the input digital signal so as to cancel that noise component. The noise component is detected as a non-correlation component present in the input digital signal; and the detected noise component is processed by a non-linear circuit which multiplies the value of the detected component by a non-linear feedback coefficient K. The value of the feedback coefficient K is switched on a random or pseudo-random basis. Preferably, K<1.

In one aspect of this invention, the value of the feedback coefficient K is switched with predetermined time-related probability. As another aspect of this invention, the switching of the feedback coefficient is controlled such that it does not occur at a regularly predictable, or highly probable, time. As a result of this invention, the average value of the feedback coefficient K may be controlled with high precision but without requiring a larger word length or larger memory capacity.

BRIEF DESCRIPTION OF THE DRAWINGS

The following detailed description, given by way of example and not intended to limit the present invention solely thereto, will best be understood in conjunction with the accompanying drawings in which.

DETAILED DESCRIPTION OF THE PREFERRED EMBODIMENTS

Figure 3:
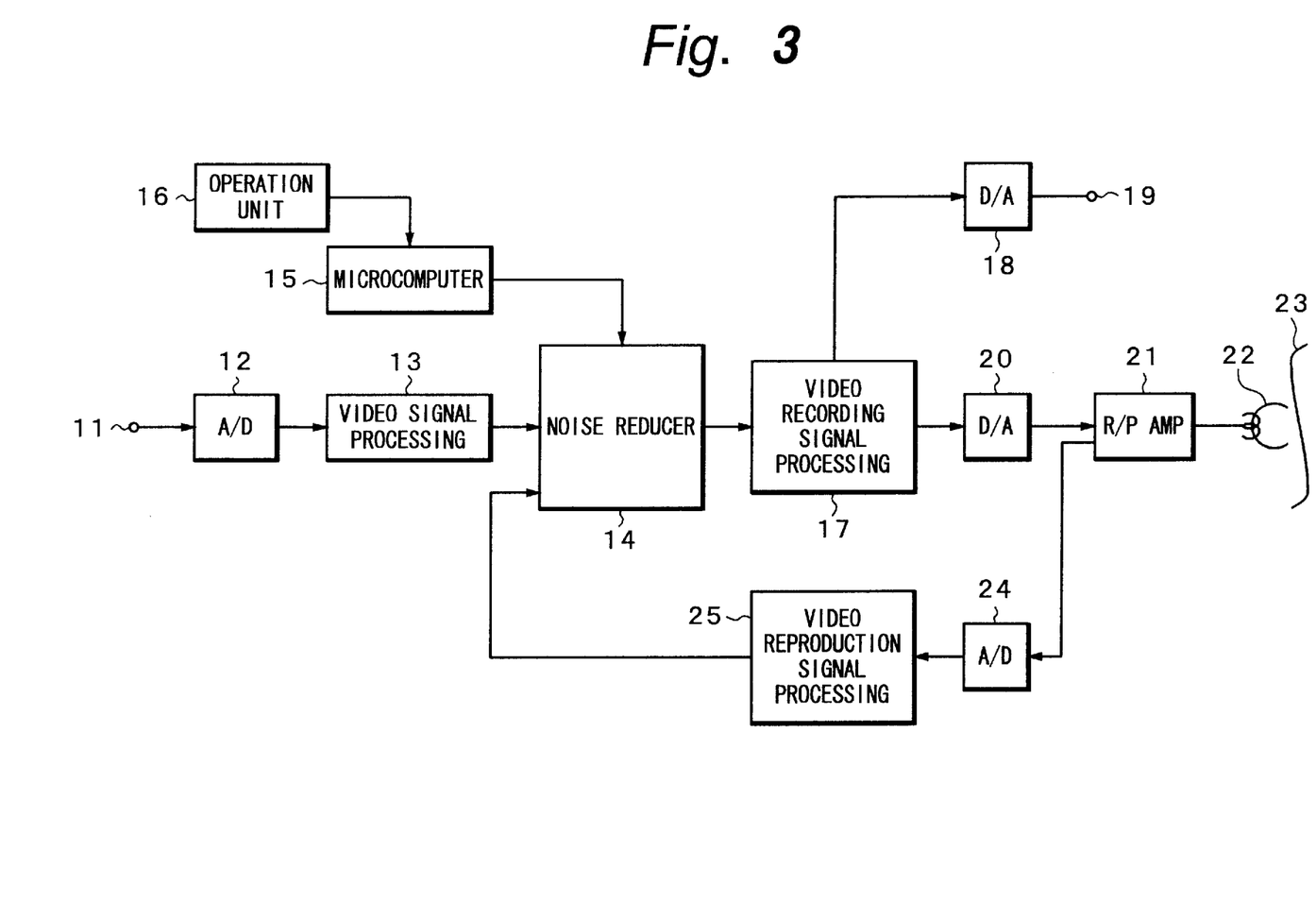
FIG. 3 is a block diagram of a video recorder in which the noise reducing technique of the present invention finds ready application.

Referring now to the drawings, FIG. 3 is a block diagram of a video recorder/playback device which incorporates a digital noise reducer 14 that may be constructed in accordance with the present invention. In the embodiment shown in FIG. 3, the video recorder is depicted as a video tape recorder, and it will be appreciated that the video recording may be an analog VTR, a digital VTR, a digital video disc (DVD) recorder/player, a magnetic disc device, or the like. It will also be appreciated that the signal which is recorded need not be limited solely to a video signal but, rather, may be other types of highly correlated signals. As will be understood from the ensuing discussion, a highly correlated signal is one in which the information from one time unit to the next (e.g., from one video frame to the next) is substantially the same. Video signals are known to be highly correlated because the video information present in one frame is substantially the same as the video information present in the next-following frame, except when frame-to-frame motion is present. For ease of discussion and for convenience, the present invention is described in the environment of a video recorder, although the word "video" is to be interpreted as illustrative and not as a limitation to the present invention. The term "video signal" is intended to refer more generally to a highly correlated signal.

An input analog signal, such as an analog video signal, is supplied to an analog-to-digital (A/D) converter 12 from an input terminal 11. The resultant digitized video signal produced by A/D converter 12 is processed by a video signal processor 13 which is adapted to separate the luminance and chrominance components from the video signal and perform respective processing functions on the separated components, such as automatic gain control on the luminance component, automatic color control and color modulation on the chrominance component, and the like. The processed luminance and chrominance components are supplied to noise reducer 14, which is described in greater detail below in respect of FIG. 4.

A microcomputer 15, such as a central processing unit, under the control of an operation unit 16, such as a graphical user interface, a keyboard, a mouse, input user-controlled switches, or the like, is used to control the noise reducing function of noise reducer 14. Operation unit 16 may be thought of as a mode control switch which also determines whether the noise reduction function should be ON or OFF. As will become readily appreciated, the noise reduction function is turned OFF simply by setting the feedback coefficient K to 0 (K=0). Operation unit 16 also is used to control the probability of occurrence of the different tables from which the feedback coefficient K is selected. The different feedback coefficient tables may be selected on a random basis, a pseudo-random basis or with predetermined probability, as will be discussed below.

The noise-reduced video signal produced at the output of noise reducer 14 is supplied to a recording processing circuit 17 which, for example, produces a composite video signal. The composite video signal, which is in digital form, may be coupled to an output terminal 19 by way of a D/A converter 18, thereby supplying a composite analog video signal to the output terminal for further processing, such as transmission, display, further recording, or the like. The recording processing circuit 17 is adapted to perform processing functions normally carried out when a video signal is recorded, such as emphasis of the luminance component, frequency modulation of the luminance component, down-conversion of the frequency band of the chrominance component, and the like.

The processed composite video signal produced by recording processing circuit 17 is converted to analog form by D/A converter 20, amplified by record/playback amplifier 21 and recorded on record medium 23 by recording head 22.

During a playback mode, the previously recorded composite video signal is reproduced from record medium 23 by head 22 and amplified by record/playback amplifier 21. The reproduced analog video signal is converted to digital form by A/D converter 24 and then processed by reproduction processing circuit 25. Circuit 25 is adapted to process the reproduced video signal in a manner that is inverse to the processing carried out by record processing circuit 17. It will be appreciated, therefore, that the reproduction processing circuit is adapted to frequency demodulate and then deemphasize the luminance component and also to up-convert the frequency band of the chrominance component. The processed luminance and chrominance components are supplied to noise reducer 14 which carries out the noise reducing process, described below, in a manner similar to the process carried out for recording the video signal. As before, the noise-reduced digital video signal is supplied from noise reducer 14 through recording processor circuit 17 and D/A converter 18 to output terminal 19.

Figure 4:
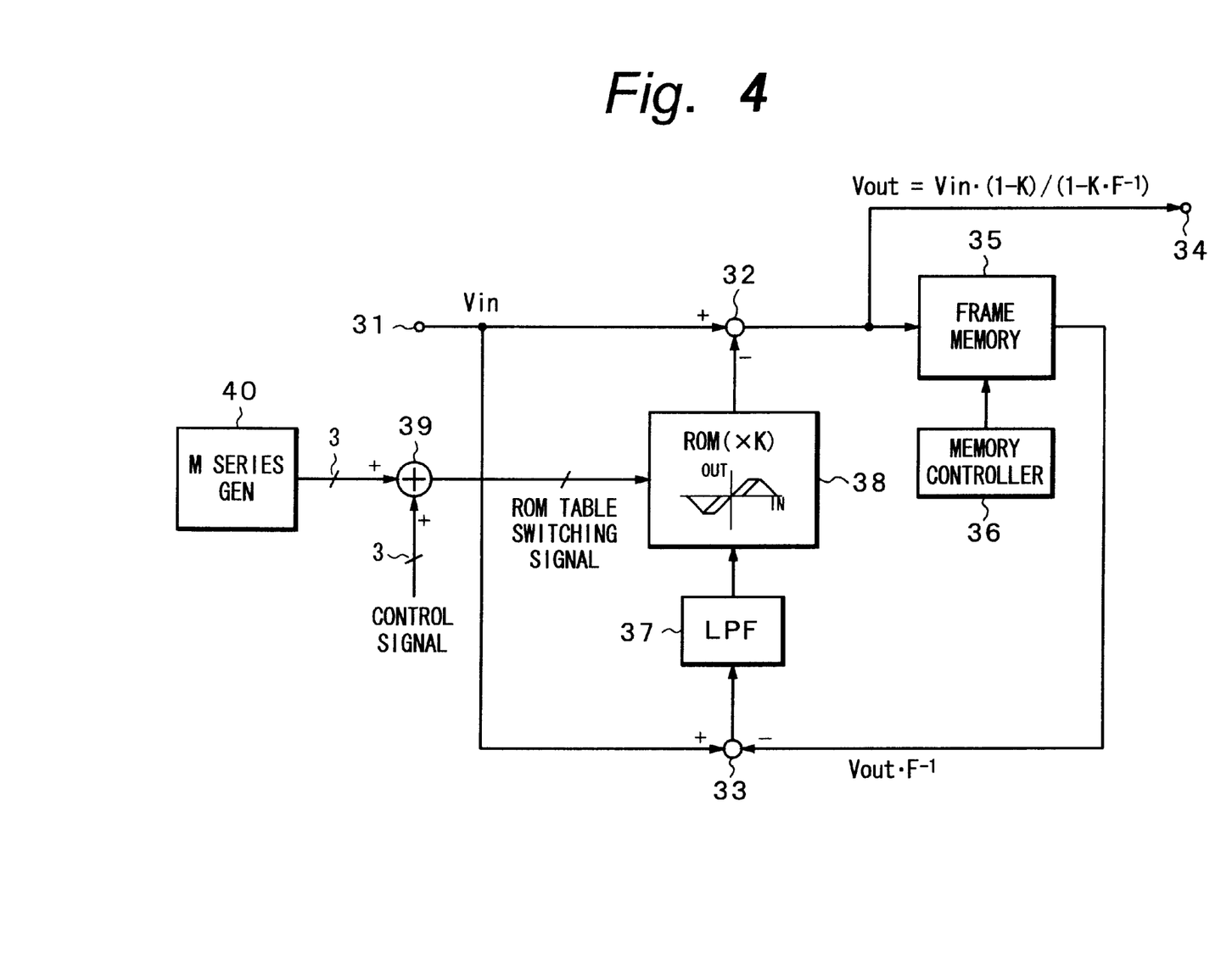
FIG. 4 is a block diagram of one embodiment of a noise reducer in accordance with the present invention.

One preferred embodiment of noise reducer 14 is illustrated in FIG. 4. Here, the digital video signal $V_{in}$ is supplied to an input terminal 31 and thence to a subtractor 32 from which the extracted, processed noise component is subtracted. The resultant video signal $V_{out}$ from which the noise component is removed is coupled to an output terminal 34 and also to a frame memory 35 in which it is stored. As was the case in the proposal shown in FIG. 1, a memory controller 36, similar to memory controller 6 of FIG. 1, is used to control the read/write cycles of frame memory 35.

The output of frame memory 35 is seen to be the video signal $V_{in}$ of the previous frame from which the noise component is deleted. The output of the frame memory thus is represented as $V_{out} \cdot F^{-1}$. That is, the output of the frame memory is equal to the video information of the previous frame from which the noise component has been deleted; and this output is coupled to a subtractor 33 for the purpose of subtracting the noise-eliminated video data in the previous frame from the video data in the present frame. The difference between the video signal of the present frame $V_{in}$ and the video signal of the previous frame $V_{out} \cdot F^{-1}$ is referred to herein as the extracted noise component; and this extracted noise component is coupled to non-linear circuit 38 from subtractor 33 by way of a low pass filter 37. As before, the video signal of the preceding frame which is stored in frame memory 35 may be represented as equation (1).

Non-linear circuit 38 functions to multiply the noise component extracted by subtractor 33 by a non-linear feedback coefficient K, wherein K varies not only as a function of the value of the extracted noise component, but also in a random or pseudo-random manner. As before, the feedback coefficient K may be implemented as a look-up table stored in a ROM wherein the value of the noise component extracted by subtractor 33 is used as the ROM read address from which predetermined values corresponding to $K \times V_{out} \cdot F^{-1}$ are stored and, preferably, two or more such look-up tables are provided. In accordance with a preferred feature of the present invention, the particular look-up table that is selected, that is, the particular selection of the feedback coefficient K, is determined on a random or pseudo-random basis or, alternatively, is selected in accordance with a fixed schedule. Preferably, the value K is less than 1, although as will be described below, $K \leq 1$. The value of the feedback coefficient K is a function of the value of the extracted noise component supplied to non-linear circuit (or ROM) 38.

The selection of the particular look-up table stored in ROM 38 now will be described. As an example, ROM 38 may be formed of both the look-up table of the type represented by FIG. 2A and the type represented by FIG. 6A, and it will also be appreciated that other look-up tables (not specifically described herein) may be incorporated in the ROM. The particular look-up table which is selected for providing the feedback coefficient K is determined by a ROM table switching signal produced at the output of an adder 39. This ROM table switching signal is derived from the summation of an M series signal produced by an M series generator 40 and a feedback coefficient control signal produced by microcomputer 15 (FIG. 3) in response to a user selection represented by operation unit 16. For example, and in accordance with a simplified embodiment, if two look-up tables are provided in ROM 38, a first of such tables is selected when the ROM table switching signal is "0" and the other is selected when the ROM table switching signal is "1". If three or more look-up tables are provided, the selection of a particular table is determined as a function of the value of the ROM table switching signal.

Figure 5:
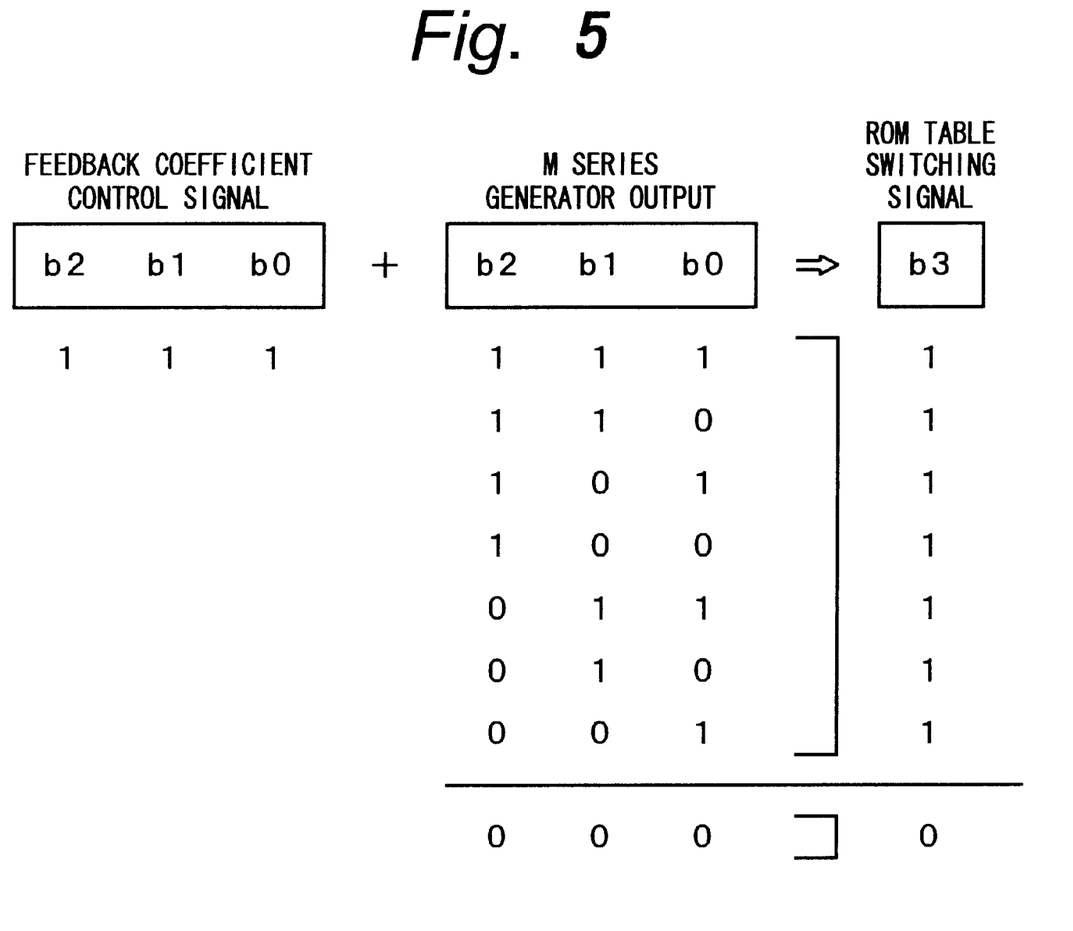
FIG. 5 is a schematic representation that is useful in explaining the probability of occurrence of a switching signal used to vary the feedback coefficient K in accordance with the present invention.

Let it be assumed that M series generator 40 generates a random digital signal formed of 3 bits. Referring to FIG. 5, these 3 bits, referred to as the M series bits, are represented as bits $b_2 b_1 b_0$. These three bits may exhibit values from 000 to 111. Moreover, the value of these 3 bits may be generated randomly, pseudo-randomly or they may be predetermined (that is, they may be generated with a fixed probability).

As represented in FIG. 5, let it be assumed that the feedback coefficient control signal likewise is a 3-bit signal. These three bits may be selected by operation unit 16 or, alternatively, such bits likewise may be generated randomly or pseudo-randomly. Adder 39 sums the 3-bit M series produced by M series generator 40 and the 3-bit feedback coefficient control signal to produce a 4-bit summation $b_3 b_2 b_1 b_0$. The most significant bit $b_3$ is used as the ROM table switching signal. Thus, for the embodiment wherein two look-up tables are included in ROM 38, one of these two tables is selected when $b_3=1$ and the other is selected when $b_3=0$.

Figure 6A:
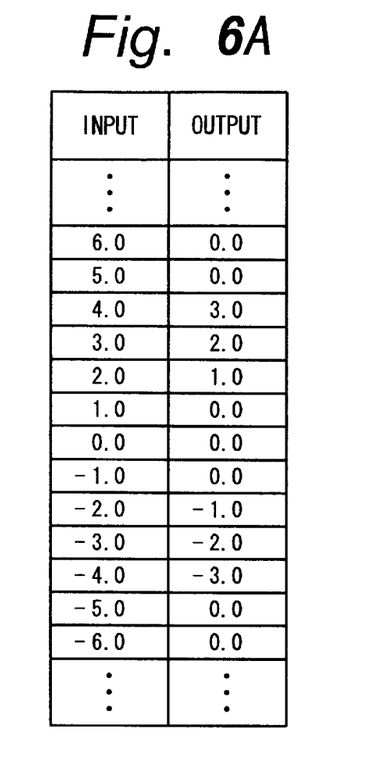
FIGS. 6A and 6B are schematic representations of a look-up table that may be used as ROM 38 in the noise reducer shown in FIG. 4.
Figure 6B:
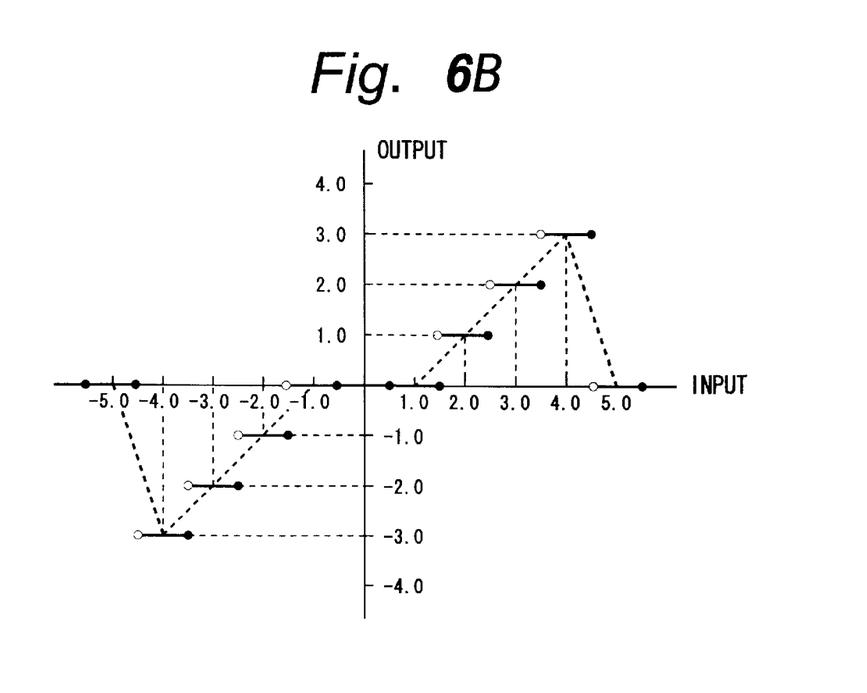

In accordance with one embodiment of the present invention, let it be assumed that one of the aforementioned two look-up tables stored in ROM 38 is the table depicted in FIG. 2A and let it be assumed that the other table stored in ROM 38 is the look-up table depicted in FIG. 6A. Referring to FIG. 6A, K=0.5 when the extracted noise component is 2.0 and, as represented by this table, K=$\frac{2}{3}$ when the value of the extracted noise component is 3.0; K=$\frac{3}{4}$ when the value of the extracted noise component is 4.0; and K=0 when the value of the extracted noise component is 5.0 and higher. Similar negative feedback coefficients are produced when the extracted noise component is a negative value.

Assuming that ROM 38 is implemented with both the look-up table shown in FIG. 2A and the look-up table shown in FIG. 6A; now, when the value of the most significant bit $b_3$ produced by adder 39 is "0", the look-up table depicted in FIG. 2A is selected. Conversely, when the value of the most significant bit $b_3$ is "1", the look-up table depicted in FIG. 6A is selected. It is appreciated, of course, that the look-up table depicted in FIG. 2A may be selected when $b_3=1$ and the look-up table depicted in FIG. 6A may be selected when $b_3=0$. The manner in which the most significant bit $b_3$ is determined now will be explained.

It is understood that the probability of occurrence of a particular state of the most significant bit $b_3$ is determinative of the probability of the selection of one or the other of the look-up tables by which ROM 38 is implemented. Stated more generally, the probability of the value of the ROM table switching signal produced by adder 39 is determinative of the value of the particular look-up table that is selected to represent the feedback coefficient K. As shown in FIG. 5, if the 3-bit value of the feedback coefficient control signal is 111, this control signal is summed with the value of the M series produced by M series generator 40, resulting in the value of most significant bit $b_3$ as "1" for all values of the M series except the value 000. That is, a particular one of the look-up tables is selected when $b_3=1$ for 7 out of 8 possible values of the M series. Hence, the probability of occurrence of this particular look-up table is $\frac{7}{8}$=87.5%.

Now, if the feedback coefficient control signal is set to 110, the most significant bit $b_3$ assumes the "1" state when the value of the M series is any one of 010 to 111. For this value [110] of the feedback coefficient control signal, $b_3=0$ when the M series is 000 or 001. Thus, the probability of $b_3$"1" is $\frac{6}{8}$=75%.

In a similar fashion, and as will be readily understood, if the value of the feedback coefficient control signal is 101, the probability that $b_3$="1" is $\frac{5}{8}$=62.5%.

If the feedback coefficient control signal is 100, the probability that $b_3$="1" is $\frac{4}{8}$=50%.

If the value of the feedback coefficient control signal is 011, the probability that $b_3$="1" is $\frac{3}{8}$=37.5%.

If the value of the feedback coefficient control signal is 010, the probability that $b_3$="1" is $\frac{2}{8}$=35%.

Finally, if the feedback coefficient control signal is 001, the probability that $b_3$="1" is $\frac{1}{8}$=12.5%.

Thus, the selection of one or the other of the look-up tables included in ROM 38 is determined as a function of whether or not $b_3=1$; and as just described, the probability that $b_3$="1" is affected by the value of the feedback coefficient control signal. This control signal is, of course, produced as a function of operation unit 16 (shown in FIG. 3). Thus, with a limited word length (as almost always is the case), the present invention improves the precision by which the average feedback coefficient K is selected; and preferably the average feedback coefficient K is less than 1, thereby obviating the "freezing" of the least significant bits of the image data stored in frame memory 35. Hence, image picture deterioration is avoided, or at least significantly minimized, by the present invention.

In the foregoing example, it has been assumed that the M series and also that the feedback coefficient control signal each is formed of 3 bits. It will be recognized, however, that the number of bits which constitute these respective signals may be greater than 3, if desired. By increasing the number of bits, the probability of occurrence of a particular value of the ROM table switching signal may be controlled with finer precision; and this will result in further improvement in the selected value of the average feedback coefficient.

Figure 7:
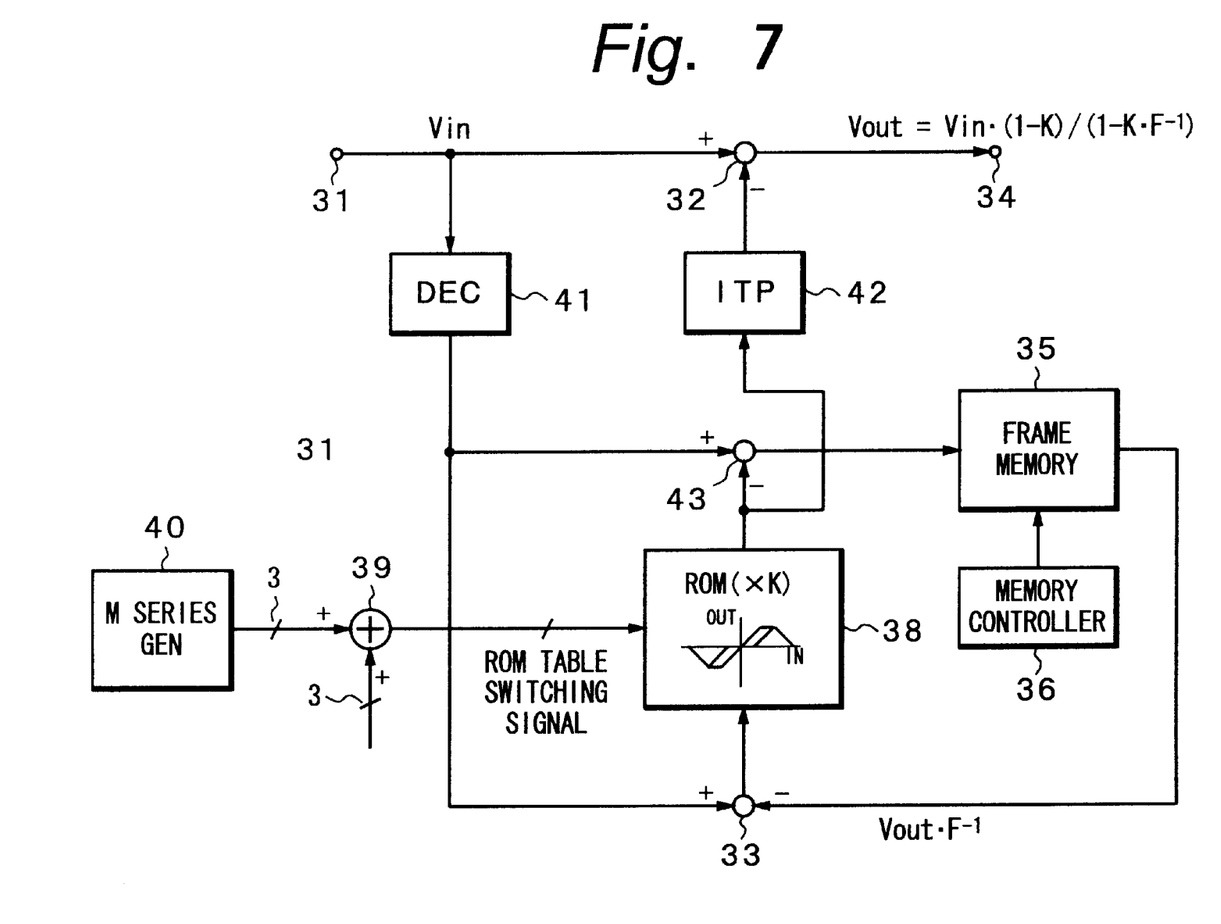
FIG. 7 is a block diagram of another embodiment of a noise reducer in accordance with the present invention.

Another embodiment of noise reducer 14 is illustrated in FIG. 7. Here, those components which have been shown and described above in conjunction with FIG. 4 are identified by the very same reference numerals that were used previously. Accordingly, for convenience, only the differences between the embodiment of FIG. 4 and the embodiment of FIG. 7 are discussed in detail.

In the FIG. 7 embodiment, the input video signal $V_{in}$ supplied to input terminal 31 is decimated in the horizontal and/or vertical direction by a decimating circuit 41. As a result of this decimation, the sampling rate of the video signal is reduced; and the sampling rate of the video signal supplied to the recursive noise filter is reduced in precisely the same manner. The reduced rate video signal is compared in subtractor 33 to the reduced rate video signal of the preceding frame, as stored in frame memory 35, to extract a noise component from the input video signal. This extracted noise component is subjected to non-linear gain control by being multiplied with the feedback coefficient K; and the resultant, processed noise component is subtracted from the reduced-rate video signal by a subtractor 43. The output of subtractor 43 is seen to be a noise-reduced video signal of the reduced sampling rate; and this noise-reduced video signal is stored in frame memory 35.

The reduced rate noise component supplied to subtractor 43 by non-linear circuit (or ROM) 38 also is supplied through an interpolator 42 to subtractor 32. The interpolator returns the sampling rate of the extracted noise component to the sampling rate of the input video signal $V_{in}$. As before, the output of subtractor 32 is seen to be the noise-reduced video signal $V_{out}$ represented by equation (1).

One advantage achieved by the embodiment shown in FIG. 7, and particularly by the use of decimating circuit 41, is that the storage capacity of frame memory 35 may be reduced. By reducing the sampling rate of the input video signal, the storage capacity of the frame memory may be similarly reduced.

While the present invention has been particularly shown and described with reference to preferred embodiments, it will be readily appreciated by those of ordinary skill in the art that various changes and modifications may be made without departing from the spirit and scope of the invention. For example, the input video signal Vin supplied to input terminal 31 of FIGS. 4 and 7 may be compressed and encoded in accordance with the MPEG standard.

By switching the selection of the feedback coefficient K randomly or pseudo-randomly, or even with a fixed probability, the value of the average feedback coefficient can be increased without increasing the word lengths of the extracted noise signal or of the values stored in ROM 38. Consequently, the memory capacity and, thus, the cost of the ROM may be reduced. Since the least significant bits representing the value of the video signal stored in frame memory 35 is not fixed, or "frozen", the so-called pseudo-outline phenomenon, which otherwise may occur by setting the feedback coefficient K to 1 when the extracted noise component produced by subtractor 33 is relatively small, can be avoided, or at least significantly minimized.

It is intended that the appended claims be interpreted to cover the embodiments that have been described, the alternatives that have been mentioned, and all equivalents thereto.

What is claimed is:

1. A method of reducing a noise component in a correlated digital signal comprising the steps of:

detecting a non-correlated component in said digital signal to produce a magnitude value representative thereof;

adjusting the gain of said detected component by a non-linear coefficient K, where K exhibits a value $\leq 1$ and said value of K is a function of the magnitude value of said detected component;

switching between different stored tables of K, wherein the values of K in one of said stored tables differ from the values of K in another of said stored tables by generating a plural-bit M series signal, generating a plural-bit control signal of user selected valued, summing said M series signal and said control signal, and selecting a stored table of K as a function of the summed signals; and subtracting the gain-adjusted detected component from said digital signal to produce a noise-reduced digital signal.

2. The method of claim 1 wherein said correlated digital signal is a digital video signal.

3. The method of claim 2 wherein said digital video signal includes luminance and chrominance components, and said non-correlated component is detected only in said luminance component.

4. The method of claim 2 wherein said digital video signal includes luminance and chrominance components, said non-correlated component is detected as a non-correlated luminance component and a non-correlated chrominance component; said detected non-correlated luminance and chrominance components are gain-adjusted, and the gain-adjusted non-correlated luminance and chrominance components are respectively subtracted from the luminance and chrominance components of said digital video signal.

5. The method of claim 2 wherein said step of detecting a non-correlated component comprises the steps of storing a predetermined interval of said digital video signal and subtracting the stored digital video signal from a next-following predetermined interval of said digital video signal.

6. The method of claim 5 wherein said predetermined interval is a frame.

7. The method of claim 5 wherein the digital video signal that is stored is the noise reduced digital video signal.

8. The method of claim 7 further comprising the steps of decimating the digital video signal before said non-correlated component is detected and subtracting the gain-adjusted detected component from the decimated digital video signal to produce a noise-reduced decimated digital video signal, such that the noise-reduced decimated digital video signal is stored.

9. The method of claim 1 wherein said step of switching between said stored tables of K is carried out in a random manner.

10. The method of claim 1 wherein said step of switching between said stored tables of K is carried out in a pseudo-random manner.

11. The method of claim 1 wherein each of said M series signal and said control signal is an n-bit signal, wherein the summed signals comprise an n+1 bit signal and a stored table of K is selected as a function of the most significant bit of said n+1 bit signal.

12. Apparatus for reducing a noise component in a correlated digital signal comprising:

detecting means for detecting a non-correlated component in said digital signal to produce a magnitude value representative thereof;

non-linear means for adjusting the gain of said detected component by a nonlinear coefficient K, where K exhibits a value $0 \leq K \leq 1$ and said value of K is a function of the magnitude value of said detected component, said non-linear means including plural stored tables of K, wherein the values of K in one of said stored tables differ from the values of K in another of said stored tables;

means for switching between different ones of said stored tables of K to select a table from which said coefficient K is selected, including means for generating a plural-bit M series signal, means for generating a plural-bit control signal of user selected valued, means for summing said M series signal and said control signal, and means for selecting a stored table of K as a function of the summed signals; and subtractor means for subtracting the gain-adjusted component from said digital signal to produce a noise-reduced digital signal.

13. The apparatus of claim 12 wherein said correlated digital signal is a digital video signal.

14. The apparatus of claim 13 wherein said digital video signal includes luminance and chrominance components, and said detecting means detects the non-correlated component only in said luminance component.

15. The apparatus of claim 13 wherein said digital video signal includes luminance and chrominance components, said detecting means detects the non-correlated component as a non-correlated luminance component and a non-correlated chrominance component, said non-linear means adjusts the gains of said detected non-correlated luminance and chrominance components, and said subtracting means subtracts the gain-adjusted non-correlated luminance and chrominance components from the luminance and chrominance components, respectively, of said digital video signal.

16. The apparatus of claim 13 wherein said detecting means comprises means for storing a predetermined interval of said digital video signal and means for subtracting the stored digital video signal from a next-following predetermined interval of said digital video signal.

17. The apparatus of claim 16 wherein said predetermined interval is a frame.

18. The apparatus of claim 16 wherein the digital video signal that is stored is the noise reduced digital video signal.

19. The apparatus of claim 18 further comprising means for decimating the digital video signal before said non-correlated component is detected and means for subtracting the gain-adjusted detected component from the decimated digital video signal to produce a noise-reduced decimated digital video signal, such that the noise-reduced decimated digital video signal is stored.

20. The apparatus of claim 12 wherein said means for switching between said stored tables of K is operable in a random manner.

21. The apparatus of claim 12 wherein said means for switching between said stored tables of K is operable in a pseudo-random manner.

22. The apparatus of claim 12 wherein each of said M series signal and said control signal is an n-bit signal, wherein the summed signals comprise an n+1 bit signal and said means for selecting a stored table of K is operable to select a table as a function of the most significant bit of said n+1 bit signal.

* * * * *